United States Patent [19]

Hinterberger

[11] 4,052,976

[45] Oct. 11, 1977

[54] NON-TRACKING SOLAR CONCENTRATOR WITH A HIGH CONCENTRATION RATIO

[75] Inventor: Henry Hinterberger, Batavia, Ill.

[73] Assignee: The United States of America as represented by the United States Energy Research and Development Administration, Washington, D.C.

[21] Appl. No.: 701,480

[22] Filed: June 30, 1976

[51] Int. Cl.² ............................................. F24J 3/02
[52] U.S. Cl. ................................ 126/271; 236/1 A
[58] Field of Search ............... 126/270, 271; 237/1 A; 60/641

[56] References Cited

U.S. PATENT DOCUMENTS 1,946,184  2/1934  Abbot ................................. 60/641

3,875,926  4/1975  Frank ................................. 126/271

FOREIGN PATENT DOCUMENTS 257,425  5/1963  Australia ............................ 126/271

Primary Examiner—Kenneth W. Sprague
Attorney, Agent, or Firm—Dean E. Carlson; Frank H. Jackson; Paul A. Gottlieb

[57] ABSTRACT

A nontracking solar concentrator with a high concentration ratio is provided. The concentrator includes a plurality of energy absorbers which communicate with a main header by which absorbed heat is removed. Undesired heat flow of those absorbers not being heated by radiant energy at a particular instant is impeded, improving the efficiency of the concentrator.

11 Claims, 4 Drawing Figures

NON-TRACKING SOLAR CONCENTRATOR WITH A HIGH CONCENTRATION RATIO

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

There are a variety of solar energy collectors having an energy receiver upon which energy to be collected is directed, where only a portion of the receiver surface has energy directed upon it at a particular instant. Losses result from those portions of the receiver surface which do not have radiation directed thereupon. Heat flows to the unirradiated portions by conduction through the receiver surface from those portions which are irradiated due to the thermally interconnected nature of prior art receivers, and by convection from the hot fluid circulating simultaneously through heated and unheated portions of prior art receivers.

For example, one type of solar collector is the parabolic mirror which directs radiant energy incident thereon to a particular point or focus. Such a mirror is usually stationary and due to the motion of the sun, the focus will move over a particular path each day. With prior art unitized receivers positioned to cover the particular path, only that portion of the receiver upon which the focus was incident would actually be heated. Losses occur from the other portions of the receiver surface not irradiated at a particular instant.

It is therefore an object of this invention to provide an improved solar collector with a high concentration ratio.

Another object of this invention is to provide a non-tracking solar concentrator with reduced heat loss from the receiver surface.

SUMMARY OF THE INVENTION

In a radiant energy concentration and collection device, such a device having a parabolic reflector directing incident energy to a focus, there is provided a plurality of energy absorbers. The absorbers are positioned so that the focus, which moves as the sun moves, is incident on at least one, and ideally no more than two, absorbers at any one instant. Each absorber is comprised of a bulb and each bulb is coupled to a main header. The header is partially filled with fluid and communicates with the bulb so that the bulb is filled with fluid. In one embodiment, a tube from each bulb extends into the header above the level of the fluid. When energy is incident on a bulb, the fluid therein boils and the resultant gas is transported to the unfilled portion of the header via the tube where it is utilized. In another embodiment, a separate conduit is contained within the header and the boiled fluid from the bulb heats the conduit which then heats the fluid within the conduit. Those absorbers not heated by incident radiant energy are inhibited from dissipating heat since they are not directly heated by the heat absorbed by adjacent absorbers upon which the energy is actually directed.

DETAILED DESCRIPTION

Figure 1:
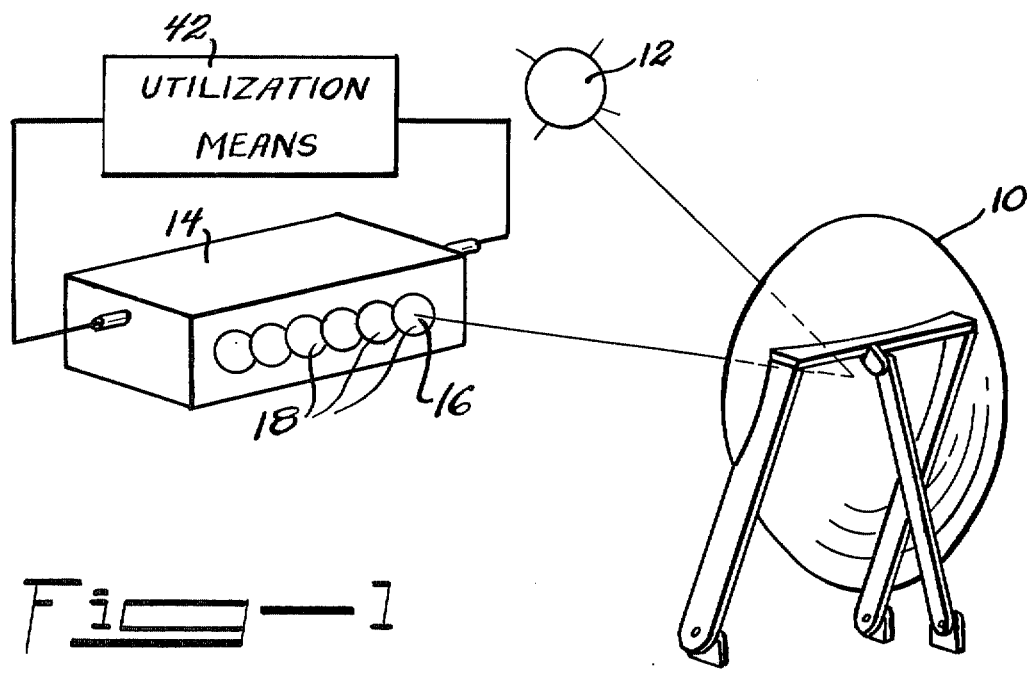
FIG. 1 shows one type of solar collector which may utilize the disclosed invention.

Referring to FIG. 1, there is shown a device for the collection and concentration of incident radiant energy. It includes a primary mirror 10 which focuses incident radiation from a source such as the sun 12 onto a receiver 14. Receiver 14 is a device which converts the concentrated incident radiant energy directed thereto by mirror 10 into a usable form. For example, the incident radiant energy can be used to heat a circulating fluid or boil a fluid with the resulting heated fluid or gas being used to perform a particular task.

In the embodiment shown in FIG. 1, the primary mirror 10 focuses the incident energy to a focus point 16 somewhere on receiver 14. Mirror 10 is designed to be stationary so that as the sun moves across the sky, the focus point 16 sweeps across the receiver 14. Thus, only one portion of receiver 14 is radiated at any one instant. There is herein provided a design for receiver 14 to minimize heat loss from unradiated portions of receiver 14. The receiver 14 is provided with a plurality of individual energy absorbers 18 aligned adjacent each other so that wherever focus 16 is incident it is always incident on at least one, and preferably no more than two, absorbers 18 at any one instant.

Figure 2:
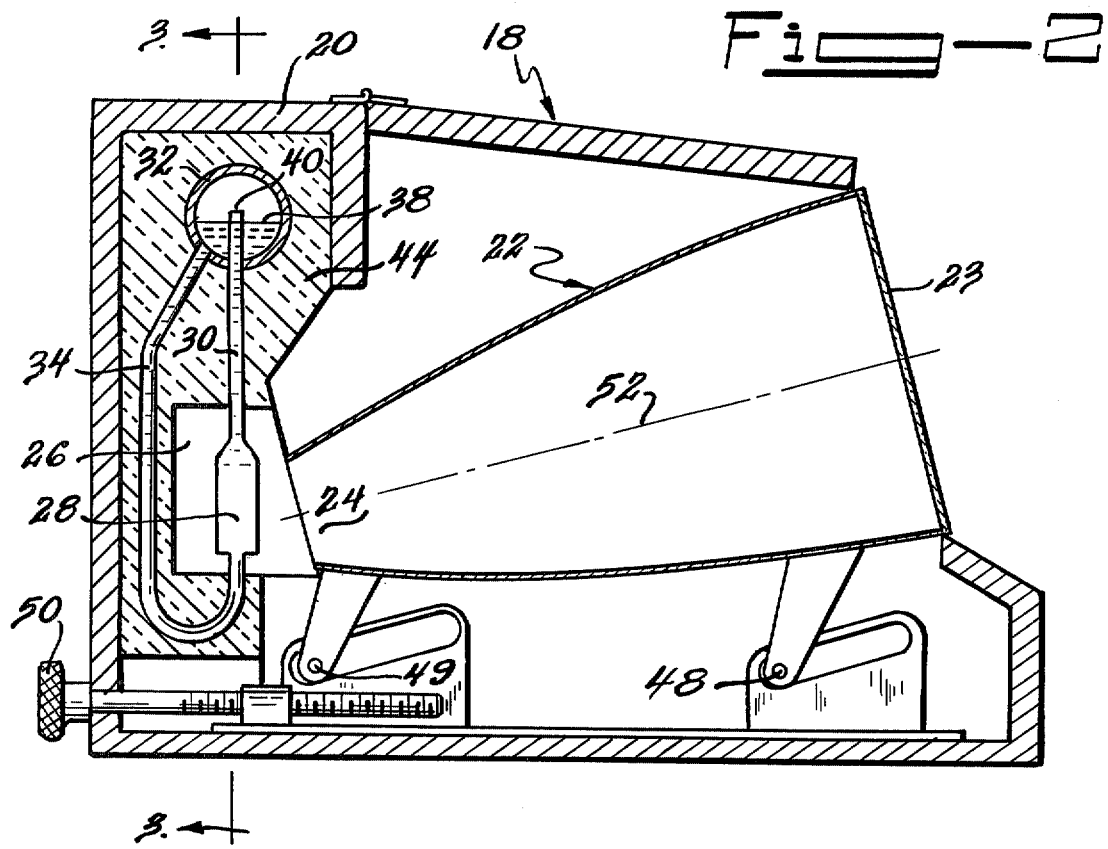
FIG. 2 shows a cross section of the receiver of the collector of FIG. 1.
Figure 3:
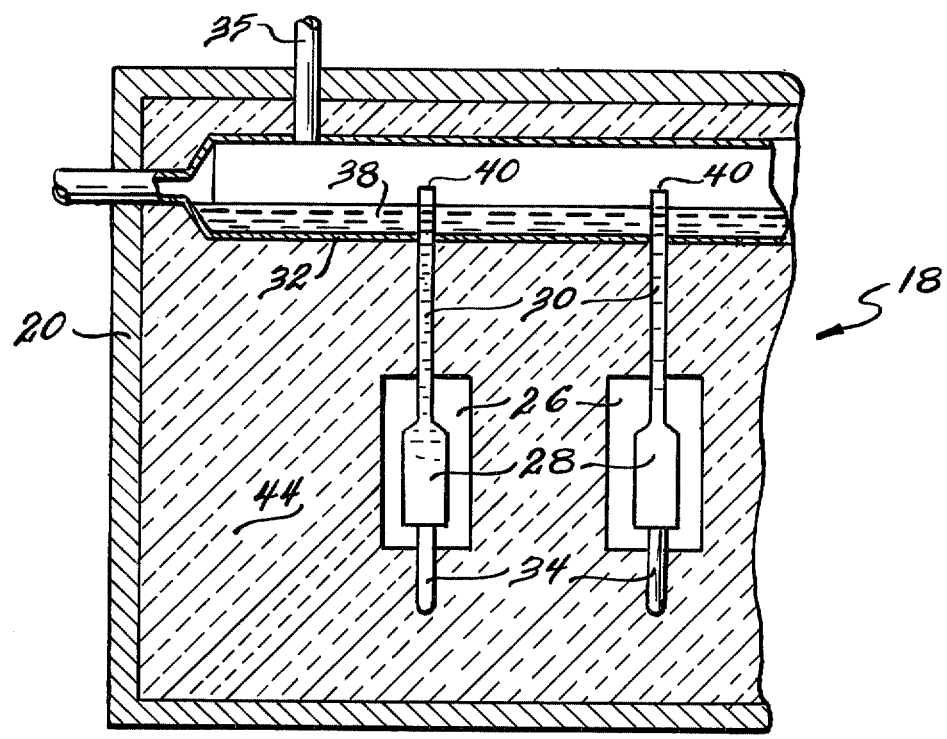
FIG. 3 shows a section through line 3—3 of FIG. 2.

Referring to FIG. 2 and FIG. 3, there is shown a detailed representation of each absorber 18. Each absorber is mounted on frame 20 which forms the structure of receiver 14. Each absorber is provided with an optical funnel 22 conical in shape, preferably contoured according to the principles described in a publication entitled "Efficient Light Coupler for Threshold Cherenkov Counters", by Hinterberger and Winston found in the *Review of Scientific Instruments*, No. 37, page 1094 (1966). The purpose of funnel 22 is to further concentrate at the exit aperture 24 of funnel 22 energy directed thereto by mirror 10. Each funnel 22 is covered with a window 23 of optically clear material to provide protection and to reduce convective losses from each absorber. At the exit aperture 24 of each funnel 22 there is a cavity 26 which contains a bulb 28. The shape of the bulbs 28 generally conforms to the shape of aperture 24. The bulbs are generally positioned in the plane just in front of where point 16 or the focus actually converges. Funnels 22 are in front of this plane so that the concentrated energy from mirror 10 is not fully converged and therefore may be further concentrated by each funnel 22. The top of each bulb 28 is coupled via a thin tube 30 to a header 32, while the bottom of each bulb 28 is coupled to header 32 by a conduit 34. Header 32 is partially filled with a fluid 38 which via conduit 34 also fills bulb 28 and tube 30. Communication with header 32 for the purpose of filling it with fluid 38 and for instrument connections to monitor gas pressure and temperature is provided by inlet 35. Tube 30 extends into header 32 with the top 40 of tube 30 above the level of fluid 38 in header 32. Tube 30 should generally be of a material having a low thermal conductivity, such as stainless steel.

When radiant energy, focused by mirror 10 and further concentrated by funnel 22, is incident on a bulb 28, the fluid within bulb 28 ideally boils. The resulting gas rises in tube 30 and is released into the portion of header 32 not filled with fluid 38. As shown in FIG. 1, utilization means 42 are coupled to header 32 and such means 42 makes use of the resulting heated has contained in the unfilled portion of header 32. For example, with fluid 38 water, steam will be produced and this steam might, for example, be used by utilization means 42 for space heating or air conditioning. Enhancement of the transfer of heat from the incident radiant energy to bulb 28 may be obtained by coating bulb 28 with a selectively absorptive black coating and by making the walls of cavity 26 reflective. The absorbers 18 are arranged on receiver 14 so only a limited number of absorbers 18 have energy directed thereto at an instant. Thus, generally only one or two bulbs 28 have energy directed thereto at any one instant. The design of the interconnection of all bulbs 28 to the header 32 limits heat dissipation from any of the unheated bulbs 28. This is because both the tubes 30, which are preferably of a low heat-conductive material, and fluid 38 filling tubes 30 and a portion of header 32 inhibit the flow of heat from the portion of header 32 not filled with fluid 38 back down to the bulbs 28 not radiated by incident energy. Further, funnels 22 which concentrate additionally the incident energy, allow the bulbs 28 to be widely separated from each other, as shown in FIG. 3, and therefore insulation 44 can be provided in this separation to further reduce heat transfer from radiated to unradiated bulbs 28.

Figure 4:
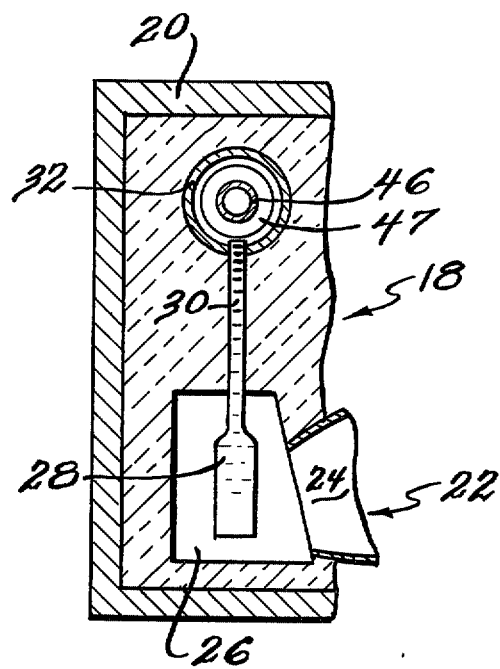
FIG. 4 shows another embodiment of the receiver of FIG. 2.

Referring to FIG. 4, there is shown an alternate embodiment for removing heat developed by the boiling of fluid 38 in each bulb 28. Here bulb 28 communicates with header 32 only via tube 30. Within header 32 there is provided a tube 46 having a fluid therein. The tube 46 is of a highly heat-conductive material and may include heat-conductive fins 4. Heat is transferred from the boiling fluid 38 through the walls of tube 46 to the fluid therein. The heated fluid in tube 46 may then be utilized by utilization means 42.

The path across receiver 14 traced by point 16 is generally curved with the curvature varying with the season. To provide an alignment of absorbers capable of adapting to this changing curvature, each funnel 22 may be provided with a mechanism to adjust the height of the funnel, as shown in FIG. 2. There, each funnel 22 is mounted on sliding hinges 48 and 49. Screw 50 is coupled to one hinge 49 so that, by turning screw 50, the elevation of each funnel may be varied to adapt to the changing curvature of the path of point 16. Of course, absorbers 18 could be stacked one on top of another in a permanent arrangement to cover all possible paths of point 16. To insure that the point 16 is always incident on one of the absorbers 18, the funnels 22 may be overlapped slightly by, for example, truncating them from their ideal length, as described in the publication.

A mirror 10 and set of funnels 22 can view about 50 degrees of solar motion without excessive aberration. In the northern hemisphere, three mirror and funnel arrays facing southeast, south, and southwest could then receive sunlight throughout most of the day. Each funnel 22 may by designed with the maximum ratio of entrance aperture to exit aperture possible for the angle subtended by the large mirror 10 as viewed from each funnel 22. The funnels 22 are aligned generally so that the axis of each funnel 52 passes through the center of mirror 10.

Selection of fluid 38 is determined by the concentration ratio obtained from morror 10 and funnels 22 and the boiling point of the particular fluid. The fluid should boil with the particular concentration of radiant energy expected to be obtained.

While the device has been described in detail with respect to a parabolic mirror, cone-shaped funnel combination, it is not limited to this form. Any collector wherein timewise uneven heat distribution over the surface of the receiver occurs, can utilize the teaching of this invention to reduce radiated heat loss from unheated portions of the receiver. For example, the invention might be utilized with a collector wherein energy is directed onto the receiver in extended bands, for example, with cylindrical parabolic mirrors and cylindrical trough-shaped collectors. In this instance, the bulb shape would no longer conform to the conical receiver but would be extended to conform to trough shape. However, the principle of communicating each absorber segment with a main header pipe would remain unchanged.

The embodiments of the invention in which an exclusive property or privilege is claimed are defined as follows:

1. In a radiant energy concentration and collection device having a reflector for concentrating incident radiation to a location with the position of the location varying with time, and an energy receiver upon which the location is directed, the improvement in said receiver comprising:

a header, a plurality of bulbs, and thin tubes, each of said thin tube coupling one of said bulbs to said header, said bulbs being positioned in the receiver so that the location is always incident on at least one bulb, said bulbs containing a fluid, with the location incident on a particular bulb the fluid therein boils, thereby producing heated gas which collects in said header, and utilization means coupled to said header for utilizing said heated gas.

2. The device of claim 1 wherein the reflector concentrates indicent radiation to a point with said point being the location.

3. The receiver of claim 2 further including a plurality of secondary concentrators, each being positioned between one of said bulbs and the reflector for further concentrating radiation directed by the reflector to the receiver.

4. The receiver of claim 3 further including conduit means coupling each of said bulbs to said header and wherein the top of each of said tubes extends into said header, said fluid occupying a portion of said header below the height of said tops of said tubes and communicates between said bulbs, said tubes, said conduit means and said header, with the location incident on a particular bulb the fluid therein boils with said heated gas travelling via said tube and collecting in the unoccupied portion of said header and thereby being separated from said bulbs by said fluid in said occupied portion of said header.

5. The receiver of claim 4 wherein said tubes are a material having a low thermal conductivity.

6. The receiver of claim 5 wherein said tubes are of stainless steel.

7. The receiver of claim 3 further including a conduit positioned within said header and having within a heat transfer material, said heat transfer material absorbing heat from said heated gas in said conduit, said utilization means being coupled to said conduit for utilizing the heat absorbed by said heat transfer material.

8. The receiver of claim 7 wherein said conduit is finned.

9. The receiver of claim 3 wherein said secondary concentrators are conical.

10. The receiver of claim 9 further including means for varying the height of said secondary concentrators.

11. The receiver of claim 10 wherein said secondary concentrators are permanently mounted on said receiver and are so arrayed that the location is incident on at least one secondary concentrator during desired collection times.

* * * * *